Oct. 10, 1944.　　　O. KILTIE　　　2,359,768

PHASE CONVERTER

Filed March 9, 1942

Inventor:
Ordean Kiltie,
by Harry E. Dunham
His Attorney.

Patented Oct. 10, 1944

2,359,768

UNITED STATES PATENT OFFICE 2,359,768

PHASE CONVERTER

Ordean Kiltie, Fort Wayne, Ind., assignor to General Electric Company, a corporation of New York Application March 9, 1942, Serial No. 433,879

19 Claims. (Cl. 172—238)

This invention relates to phase converters and more particularly to improvements in static means for converting from polyphase to single phase and vice versa.

The invention is characterized by balanced operation on the polyphase side for any given condition of operation on the single-phase side and by a substantially direct proportion between the voltages of its polyphase and single-phase sides with variations in load.

An object of the invention is to provide a new and improved static phase converter.

Another object of the invention is to provide a static phase converter which has balanced operation on its polyphase side with single-phase operation on its other side.

A further object of the invention is to provide a static phase converter for converting from polyphase operation to single-phase operation and vice versa in which the load voltage is more dependent on the supply voltage than it is on the load current.

The invention will be better understood from the following description taken in connection with the accompanying drawing and its scope will be pointed out in the appended claims.

Figure 1:
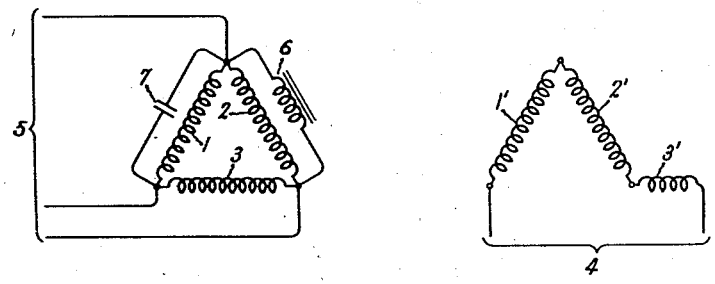
Figure 2:
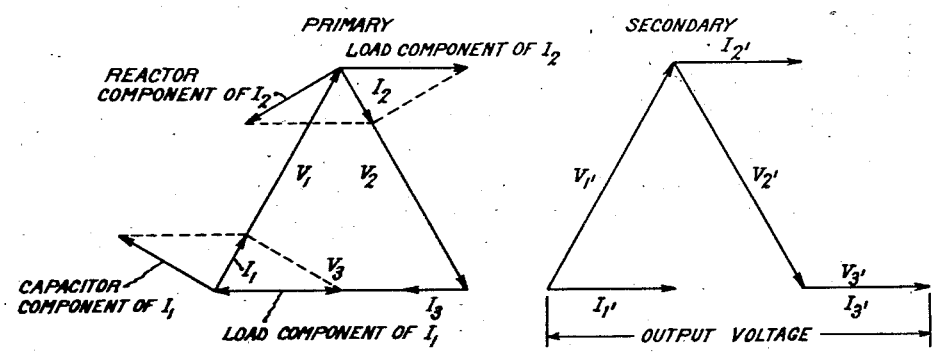
Figure 3:
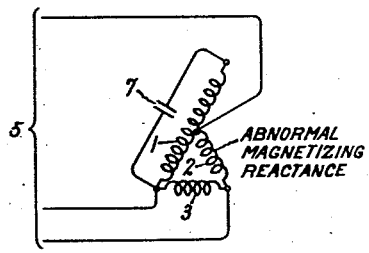
Figure 4:
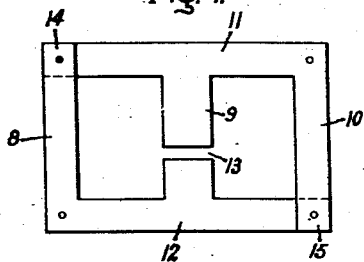

In the drawing Fig. 1 illustrates diagrammatically an embodiment of the invention for interconnecting a three-phase circuit and a single-phase circuit, Fig. 2 is a vector diagram for illustrating the operation of Fig. 1 when the load is a fixed resistance load, Fig. 3 is a modification, and Fig. 4 illustrates a three phase magnetic core suitable for use with the circuit of Fig. 3.

Referring now to the drawing and more particularly to Fig. 1, the illustrated embodiment of my phase converting transformer means comprises three transformer windings 1, 2 and 3 which are inductively related respectively to three other windings 1', 2' and 3'. The windings 1', 2' and 3' are connected in series with each other to a single-phase circuit 4 and the windings 1, 2 and 3 are symmetrically interconnected to a three phase circuit 5. As shown, by way of example, they are delta connected.

The various pairs of inductively related windings do not all have the same turn or voltage ratios and as shown the winding 3' has fewer turns than the other windings so that the turn ratio of the pair of windings 3—3' is different from the turn ratios of the other pairs of windings. As will be explained hereinafter, the purpose of this is to give balanced or equal wattage operation with respect to the separate phases of the three-phase circuit.

In order to obtain balanced power factor and balanced volt-ampere operation of the separate phases of the three-phase circuit suitable phase modifying means in the form of a reactor 6 and a capacitor 7 are provided. As shown by way of example, these are connected in parallel circuit relation with the windings 2 and 1 respectively.

The operation of Fig. 1 can best be explained by reference to the vector diagram shown in Fig. 2. Assuming that the three-phase circuit 5 is the supply circuit and the single-phase circuit 4 is the load circuit, then the windings 1, 2 and 3 constitute the primary winding and the windings 1', 2' and 3' constitute the secondary winding of the transformer means. Vectors $V_1'$ and $V_2'$ and $V_3'$ represent the voltages which are induced in the respective secondary phase windings by the corresponding primary phase windings. When a load is connected across the circuit 4 the same load current will, of course, flow through each of the three secondary phase windings. Assuming that this is a unity power factor load this current in each of the secondary phase windings is represented by the three equal vectors $I_1'$, $I_2'$ and $I_3'$. It will be observed that the current and voltage in the winding 3' are in phase with each other so that this winding operates at unity power factor whereas this current lags (counterclockwise phase rotation is assumed) the voltage of winding 1' by sixty degrees and leads the voltage of winding 2' by sixty degrees. As power factor may be defined as the cosine of the phase angle between voltage and current and as the cosine of sixty degrees is one-half, the power or watts supplied by windings 1' and 2' would be one-half that of winding 3' if the voltages of all three windings were equal. However, the winding 3' is provided with only half as many turns as the windings 1' and 2' so that its voltage is one-half the voltage of the other two. It therefore follows that the watts or real power supplied by each of the secondary windings is the same.

It will be noted from Figs. 1 and 2 that winding 3' and its voltage $V_3'$ are reversed with respect to their normal polyphase directions so that the voltage of the circuit 4 is 1½ times the voltage of winding 1' (or winding 2') and three times the voltage of winding 3'.

Referring now to the left-hand or primary side of Fig. 2, the voltages of the windings 1, 2 and 3 form the equilateral triangle $V_1$, $V_2$ and $V_3$. For simplicity it is assumed that windings 1, 2 and 3 all have the same number of turns and windings 1' and 2' also have the same number of turns as the primary windings. Therefore, in the primary side the voltages are equal and the load components of current are unequal by reason of the difference in turn ratio between the windings 3—3' and the other associated sets of windings. Thus, the load component of current in the primary phase winding 3 is $I_3$ which is one-half of the load components of current in the windings 1 and 2. As shown, these latter two load components of current are equal in magnitude and in phase with the corresponding secondary components by reason of the fact that the voltages of the corresponding primary and secondary windings are also equal.

As the load component of current in the winding 1 lags the voltage $V_1$ of this winding, a quadrature leading component of current is introduced in the winding 1 by means of the capacitor 7. These two components produce the resultant current $I_1$ which is in phase with the voltage $V_1$ of the winding 1. In a like manner the leading effect of the load component of current in winding 2 with respect to the voltage $V_2$ of this winding is corrected by means of a quadrature lagging component of current introduced by the reactor 6, these two components combining to form the resultant current $I_2$ which is in phase with the voltage $V_2$. The result is that the currents in each of the windings 1, 2 and 3 are in phase with their respective voltages so that the circuit on the primary side operates at unity power factor. Furthermore, as the angle between the resultant current in the windings 1 and 2 and the load components of these resultant currents is sixty degrees in each case it follows that the resultant currents are one-half the magnitude of their respective load components. Therefore, the resultant currents in the windings 1, 2 and 3 are equal in magnitude so that the operation on the polyphase side is balanced as to volt-amperes and watts.

The equal unity power factor currents in the windings 1, 2 and 3 combine with each other to produce equal currents in the conductors of the supply circuit which are in phase respectively with the voltage to neutral of their respective conductors. Thus each line current equals the vector difference between the current in the two windings to which it is connected. Therefore the phases of the supply circuit are also balanced as to watts, power factor and volt-amperes.

If the power flow is reversed so that the single-phase circuit is the supply circuit and the three-phase circuit is the load circuit, then the reactive means 6 and 7 will serve as phase splitting means so as to provide the proper angular relationships between the currents and voltages of the windings 1, 2 and 3 in order to provide symmetrical three-phase operation.

If the load varies in magnitude the polyphase circuit will no longer be balanced as to power factor and volt-amperes of its phases unless the magnitudes of the phase modifying currents supplied by the reactor 6 and the capacitor 7 are correspondingly readjusted in magnitude.

If the power factor of the load is varied, then it will be necessary to readjust the turn ratios of the sets of windings as well as to readjust the relative reactances of the reactor 6 and the capacitor 7 in order to obtain balanced operation.

The same principles are applicable to a polyphase circuit of any number of phases so that by means of suitably proportioned turn ratios and reactive means balanced operation may be obtained with circuits of other than three phases.

For some applications the voltages of circuit 1 may be too low for economical direct applications to a capacitor. This can readily be corrected by making winding 1 in the form of an autotransformer for stepping up the voltage of the capacitor 7. This modification is shown in Fig. 3. It is also not necessary to provide a separate reactor 6 for the winding 2 and the necessary lagging component of current may be obtained by giving the winding 2 an abnormal magnetizing reactance. For example, its core might be provided with an air gap so that it requires an abnormally high exciting or magnetizing current. This arrangement is also illustrated schematically in Fig. 3.

The different sets or pairs of inductively related windings may be mounted respectively on different legs of a multi-legged transformer core. One such core which is particularly adaptable for use with the modified circuit of Fig. 3 is shown in Fig. 4. It comprises three legs 8, 9 and 10 whose tops and bottoms are joined respectively by yoke members 11 and 12. The windings 1 and 1' may be mounted on leg 8, the windings 2 and 2' on leg 9, and the windings 3 and 3' on leg 10. It will be noted that the leg 9 has an air gap 13 for providing the abnormal amount of lagging exciting current required by the winding 2. This core may conveniently be made up of identical F-shaped laminations which are mounted face to face and reversely like the numerals forming the number 69, the adjoining ends of the laminations being interleaved. By means of this construction the joints or interleaving will be at 14 and 15 so as to provide means for adjusting the air gap 13 while still leaving a good closed magnetic joint in the outer legs at 8 and 10.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a polyphase circuit, a single-phase circuit and static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, certain of said sets of windings having different turn ratios than another of said sets.

2. In combination, a polyphase circuit, a single-phase circuit, and static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, certain of said sets of windings having different turn ratios than another of said sets, one of said windings which is connected to said single-phase circuit having its polarity reversed so as to prevent said series connection of windings from being an open corner mesh connection.

3. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, and a multi-legged magnetic core having a different one of said sets of windings on each of its legs, one of its legs being provided with an air gap.

4. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, a multi-legged magnetic core having a different one of said sets of windings on each of its legs, one of its legs being provided with an air gap, and a capacitor connected in parallel circuit relation with a winding on one of the continuous legs of said core.

5. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, and means for modifying the phase relation of the voltage and current in a plurality of said windings.

6. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, and means for modifying the phase relation of the voltage and current in a plurality of said windings, said means including a capacitor connected in parallel circuit relation with one of said symmetrically interconnected windings.

7. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, and means for modifying the phase relation of the voltage and current in a plurality of said windings, said means including a capacitor connected in parallel circuit relation with one of said symmetrically interconnected windings, said last-mentioned winding being an autotransformer for stepping up the capacitor voltage.

8. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, and means for modifying the phase relation of the voltage and current in a plurality of said windings, said means including apparatus for lowering the effective magnetizing reactance of one of said symmetrically interconnected windings.

9. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, and means for modifying the phase relation of the voltage and current in a plurality of said windings, said means including a magnetic core with an air gap for one of said symmetrically interconnected windings.

10. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, certain of said sets of windings having different turn ratios than another of said sets, and reactive means for modifying the phase relation of the voltage and current in a plurality of said windings.

11. In combination, a polyphase circuit, a single-phase circuit, static transformer means interconnecting said circuits, said means having as many sets of inductively related windings as said polyphase circuit has phases, one winding of each set being serially connected to said single-phase circuit, and another winding of each set being symmetrically interconnected to said polyphase circuit, certain of said sets of windings having such different turn ratios than another of said sets has that the watt burdens on the phases of said polyphase circuit are all substantially equal, and reactive means for so modifying the phase relation of the voltage and current in a plurality of said symmetrically interconnected windings that the power factors of the phases of said polyphase circuit are all substantially equal.

12. In combination, a polyphase supply circuit, a single-phase load circuit, transformer means having as many primary phase windings as said supply circuit has phases connected to be energized respectively by the phase voltages of said supply circuit, said transformer means having an equal number of secondary phase windings connected in series across said load circuit, and reactive current producing means effectively in parallel with certain of said windings for balancing the volt-ampere burdens on the phases of said supply circuit.

13. In combination, a polyphase supply circuit, a single-phase load circuit, transformer means having as many primary phase windings as said supply circuit has phases connected to be energized respectively by the phase voltages of said supply circuit, said transformer means having an equal number of secondary phase windings connected in series across said load circuit, and reactive means effectively connected in parallel circuit relation with certain of said windings for balancing the volt-ampere burdens on the phases of said supply circuit.

14. In combination, a polyphase supply circuit, a single-phase load circuit, and transformer means for interconnecting said circuits, said transformer means having as many primary phase windings as said supply circuit has phases connected respectively across the phases of said supply circuit, said transformer means having an equal number of secondary phase windings connected in series across said load circuit, the voltage ratios of the primary and secondary windings for certain of said phases differing from another one in order to provide an equal watt burden on the phases of said supply circuit.

15. In combination, a polyphase supply circuit, a single-phase load circuit, transformer means for interconnecting said circuits, said transformer means having as many primary phase windings as said supply circuit has phases connected respectively across the phases of said supply circuit, said transformer means having an equal number of secondary phase windings connected in series across said load circuit, the voltage ratios of the primary and secondary windings for a certain one of said phases differing from the others in order to provide an equal watt burden on the phases of said supply circuit, and reactive means effectively connected in parallel circuit relation with certain of said windings for balancing the volt-ampere burdens on the phases of said supply circuit.

16. In combination, a three-phase supply circuit, a substantially fixed value substantially unity power factor load, three equal primary windings connected respectively between different line conductors of said circuit, three secondary windings disposed respectively in inductive relation with said primary windings and connected in series with each other to said load whereby the power factor of one of said secondary windings and its associated primary winding is unity and the power factor of the other two secondary windings is one-half, said unity power factor secondary winding having one-half as many turns as each of the other two secondary windings whereby the watts in each of said six windings are equal but the volt-amperes of the other two primary windings are twice the volt-amperes of the unity power factor primary winding, and reactive means associated with each of said other two primary windings for simultaneously doubling their power factor and halving their volt-amperes whereby the supply circuit operates at unity power factor with balanced phases.

17. In combination, a three-phase supply circuit, a substantially fixed value substantially unity power factor load, three equal primary windings connected respectively between different line conductors of said circuit, three secondary windings disposed respectively in inductive relation with said primary windings and connected in series with each other to said load whereby the power factor of one of said secondary windings and its associated primary winding is unity and the power factor of the other two secondary windings is one-half, said unity power factor secondary winding having one-half as many turns as each of the other two secondary windings whereby the watts in each of said six windings are equal but the volt-amperes of the other two primary windings are twice the volt-amperes of the unity power factor primary winding, and reactive means associated with each of said other two primary windings for simultaneously doubling their power factor and halving their volt-amperes whereby the supply circuit operates at unity power factor with balanced phases, the reactive means associated with one of said other two primary windings being a capacitor effectively connected in parallel therewith.

18. In combination, a three-phase supply circuit, a substantially fixed value substantially unity power factor load, three equal primary windings connected respectively between different line conductors of said circuit, three secondary windings disposed respectively in inductive relation with said primary windings and connected in series with each other to said load whereby the power factor of one of said secondary windings and its associated primary winding is unity and the power factor of the other two secondary windings is one-half, said unity power factor secondary winding having one-half as many turns as each of the other two secondary windings whereby the watts in each of said six windings are equal but the volt-amperes of the other two primary windings are twice the volt-amperes of the unity power factor primary winding, and reactive means associated with each of said other two primary windings for simultaneously doubling their power factor and halving their volt-amperes whereby the supply circuit operates at unity power factor with balanced phases, the reactive means associated with one of said other two primary windings being a reactor effectively connected in parallel therewith.

19. In combination, a three-phase supply circuit, a substantially fixed value substantially unity power factor load, three equal primary windings connected respectively between different line conductors of said circuit, three secondary windings disposed respectively in inductive relation with said primary windings and connected in series with each other to said load whereby the power factor of one of said secondary windings and its associated primary winding is unity and the power factor of the other two secondary windings is one-half, said unity power factor secondary winding having one-half as many turns as each of the other two secondary windings whereby the watts in each of said six windings are equal but the volt-amperes of the other two primary windings are twice the volt-amperes of the unity power factor primary winding, and reactive means associated with each of said other two primary windings for simultaneously doubling their power factor and halving their volt-amperes whereby the supply circuit operates at unity power factor with balanced phases, said reactive means being of opposite sign with respect to said other two primary windings.

ORDEAN KILTIE.